United States Patent [19]

Feher

[11] 4,339,724

[45] Jul. 13, 1982

[54] FILTER

[76] Inventor: Kamilo Feher, Unit 37, 3565 Downpatrick, Ottawa, Ontario, Canada, K1V 8T3

[21] Appl. No.: 119,899

[22] Filed: Feb. 8, 1980

[30] Foreign Application Priority Data

May 10, 1979 [CA] Canada ................................. 327365

[51] Int. Cl.³ ..................... H03K 13/32; H03K 12/00; H03K 5/01
[52] U.S. Cl. ..................................... 328/164; 328/14; 328/163; 328/165; 307/268; 307/529
[58] Field of Search .................. 307/268, 529; 328/14, 328/109, 110, 165, 163, 164

[56] References Cited

U.S. PATENT DOCUMENTS

| | | | |
|---|---|---|---|
| 3,435,350 | 3/1969 | Powers ................................ | 328/14 |
| 3,497,724 | 2/1970 | Harper ................................ | 307/268 |
| 3,792,363 | 2/1974 | Gebel et al. ........................ | 328/164 |
| 3,898,572 | 8/1975 | Kato .................................... | 328/164 |
| 4,156,202 | 5/1979 | Takahashi .......................... | 328/163 |

*Primary Examiner*—John S. Heyman
*Attorney, Agent, or Firm*—Alan H. Levine

[57] ABSTRACT

A filter for a pulse form of signal which substantially reduces sidebands, yet provides an output signal which is substantially free of jitter and at the same time has no inter-symbol interference. The filter comprises means for detecting the pulse type of signal and for substituting $\pi$ radians of a sine wave signal with a positive slope upon detection of a positive going leading edge of the pulse type signal and $\pi$ radians of a sine wave signal with a negative slope upon detection of a negative going trailing edge of the pulse type signal, at an output terminal.

7 Claims, 4 Drawing Figures

FILTER

This invention relates to a filter for digital signals, and particularly to a non-linear filter for reducing the bandwidth of an NRZ (non-return to zero) type of signal.

BACKGROUND OF THE INVENTION

It is desirable to minimize the bandwidth of data signals in various transmission systems in order that more signals could be carried by a carrier while not interfering with each other. The sidebands associated with digital signals are large, where the digital signals are of good form, and ideally the bandwidth required to handle a square wave should be infinite. This, of course, is impractical in transmission systems, and filters must be used to band-limit signals in order that they should not interfere with adjacent channels.

It has been found that there were previously no known bandwidth efficient filter designs which would meet the requirements of having both no jitter and no inter-symbol interference. The requirements of a filter have been theorized by Nyquist in well-known studies; yet despite classical design techniques using R-L-C filters, active linear filters, and transversal filters, the simultaneous achievement of no jitter and no inter-symbol interference have not been obtained.

Jitter and inter-symbol interference are among the most important parameters which contribute to the probability of error and degradation of a signal in a practical system. Even if a designer would be able to design an ideal classical Nyquist filter having no inter-symbol interference, jitter would still be present.

The filter of the present invention, on the other hand, has been found to reduce the sidebands substantially, while achieving the simultaneous benefits of no jitter and no inter-symbol interference. For example, in one successful prototype, the measured in-band to out-of-band power ratio of the signal at 1.4 times the Nyquist frequency was found to be about 20 db., and at 1.6 times the Nyquist frequency the in-band to out-of-band power was measured to be 26 db., with no jitter and no inter-symbol interference, with the input an NRZ signal. Clearly this invention is a substantial improvement over prior art filters.

SUMMARY OF THE INVENTION

In general, the invention is a filter having an input for receiving a pulse form of input signal and an output for providing an output signal correlated to the input signal comprising means for comparing the output signal with the input signal, means for generating a first predetermined output signal waveform in the event the output signal amplitude is different from that of the input signal and the input signal is "one", means for generating a second predetermined output signal waveform in the event the output signal amplitude is different from that of the input signal and the input signal is "zero", means for generating a third predetermined output signal waveform in the event the output signal amplitude is the same as that of the input signal and the input signal is "one", and means for generating a fourth predetermined output signal waveform in the event the output signal amplitude is the same as that of the input signal and the input signal is "zero", in which the predetermined output signals are continuous, whereby the spectra and side lobes of the output signal which is correlated to the input signal are controlled to a predetermined extent. Preferably the third predetermined output signal waveform is a D.C. level at the amplitude of the input signal, and the fourth predetermined output signal waveform is a negative D.C. level of the amplitude of the input signal. The first predetermined output signal waveform should be a portion of a sine wave having a waveform of $A \sin \pi T$, and the second predetermined output signal waveform is a portion of the sine wave having a waveform of $-A \sin \pi T$, where A is the amplitude of the input signal and T is time from the beginning of the first predetermined output signal waveform.

In another form of the invention, when there is no transition between the present and previous data bits a constant D.C. voltage would prevail in the overlapping region and when there is a transition between the present and the previous bits a positive even function should connect the D.C. to the output without any discontinuity. However when there is a positive transition from a 0 to a 1 in the input data stream, a waveform $S_1$ should be connected to the output during one bit interval; when there is a negative transition from 1 to 0 in the input data stream waveform $S_2$ should be connected to the output during one bit interval, and when there is no transition, a positive or negative D.C. level should be connected to the output according to the logic levels of the input data (1 or 0). The switching-on time should also be one-bit interval. Waveform $S_1$ and $S_2$ are $\pi$ radians of a sine or cosine wave.

The D.C. level should be equal to the peak value of the sine waves so that the resulting output signal waveform is smooth and continuous.

INTRODUCTION TO THE DRAWINGS

A more detailed understanding of the invention will be obtained by reference to the detailed description below, and to the following drawings, in which.

Figure 3:
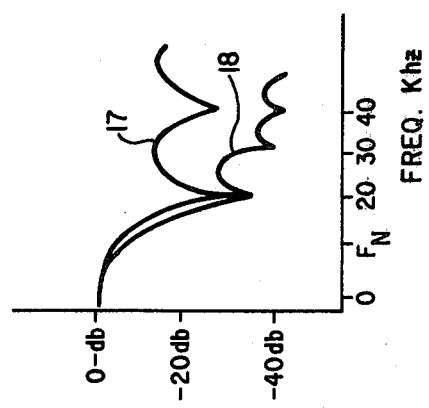
Figure 4:
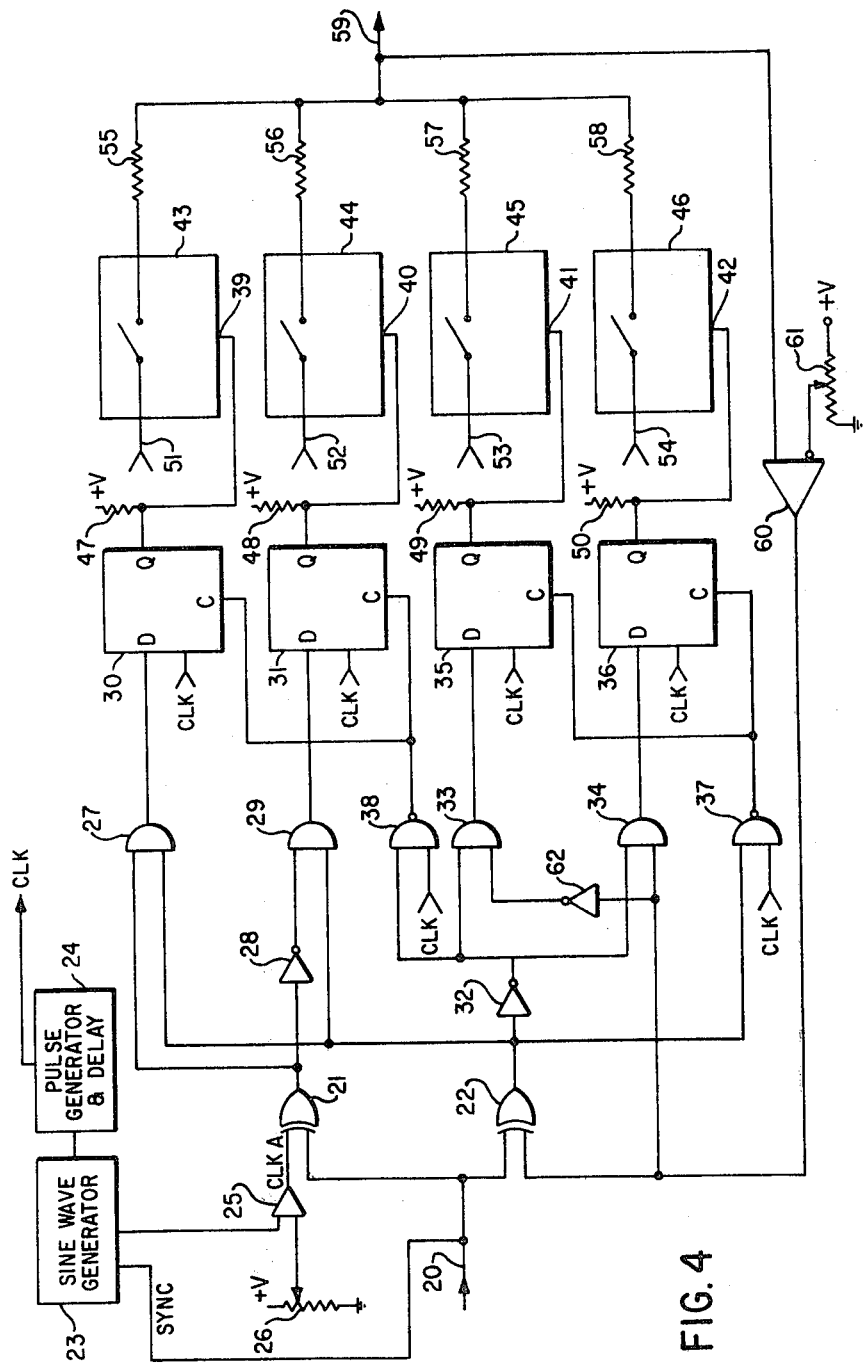

FIG. 3 which shows the bandwidth of an unfiltered signal and of a filtered signal, and FIG. 4 which is a logic schematic diagram of an embodiment of the invention.

DESCRIPTION OF THE PREFERRED EMBODIMENT

Figure 1:
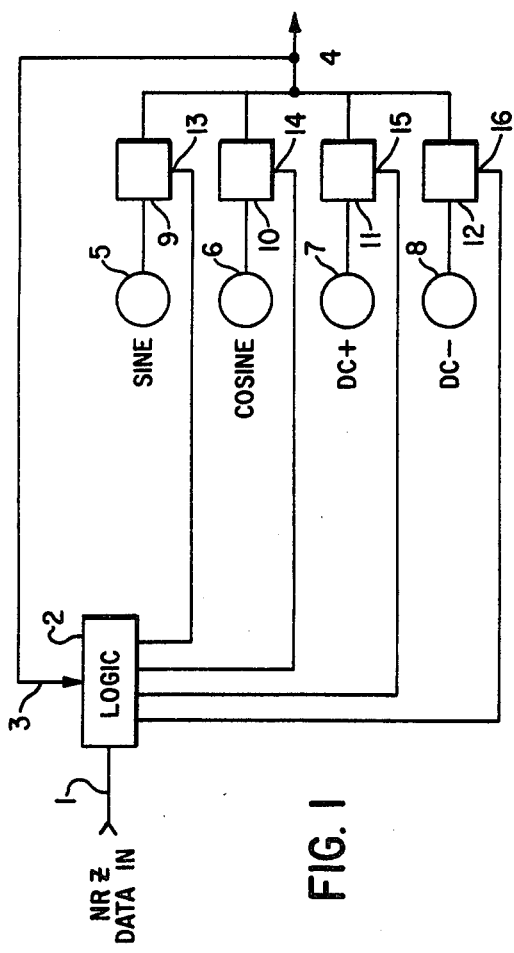
FIG. 1 is a general block schematic of the invention.

Turning first to FIG. 1, an input lead 1 is shown which is connected to a logic circuit 2. Also connected to the logic circuit is a lead 3 which is connected to the output lead 4 for carrying the output signal and applying it to the logic circuit.

Sine wave generator 5, cosine wave generator 6, positive D.C. signal generator 7 and negative D.C. generator 8 are respectively connected to corresponding inputs of switches 9, 10, 11 and 12. The outputs of switches 9, 10, 11 and 12 are all connected together, to output lead 4.

Four individual outputs of logic circuit 2 are connected to individual enabling inputs 13, 14, 15 and 16 of switches 9, 10, 11 and 12 for switching a signal from the sine, cosine, +D.C. or −D.C. generators to the output lead 4.

The logic circuit 2 chooses, depending on the correlation between the input data sequence, different analog waveforms and switches them on and off at the filter output.

Figure 2:
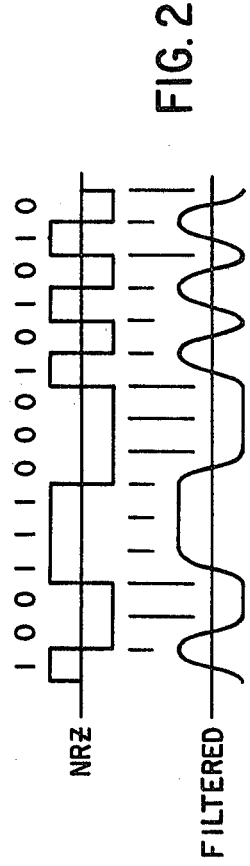
FIG. 2 is a waveform diagram which is illustrative of the invention.

Referring now to FIG. 2 with FIG. 1, depending on the correlation of the binary input signal $A_i$ (where the sample interval is T), and with the previous binary input signal being $A_{i-1}$, the logic diagram switches the signals from the generators 5-8 as follows:

1. If $A_i$ is different from $A_{i-1}$, then the portion of the sine wave A sin $\pi$T with positive slope is switched the output lead 4 is $A_i$ is 1, and the portion of A sin T with negative slope is switched to the output if $A_i$ is 0.

With reference to the portions of the sine wave having positive and negative slopes in FIG. 2, it may be seen that this rule is met.

2. If $A_i$ is the same as $A_{i-1}$, then a D.C. level of the peak sine wave amplitude is switched to the output lead 4 if $A_i$ is 1, and a negative D.C. level of the peak sine wave amplitude is switched to the output if $A_i$ is 0.

Accordingly, for an input NRZ signal as shown in FIG. 2, an output signal shown as "FILTERED" is produced.

With reference to FIG. 3, the side bands 17 of an original digital form of signal is shown, as well as the side bands 18 of the filtered signal. Clearly they are substantially below the side bands of the unfiltered signal.

The filter can also be obtained by using the raised cosine double interval pulse $s(t) = \frac{1}{2}(1 + \cos \pi t/T)$ for $-t/T-$ being smaller than 1. The same binary input sequence as shown in FIG. 2 may be considered for illustration, but of course there will be a 90° phase shift.

For $a_i$ equals 1, a raised cosine double-interwalled pulse $s(t) = \frac{1}{2}(1 + \cos \pi t/T)$ is switched to the output lead 4, and for $a_i$ equals 0, a corresponding negative pulse $-s(t)$ is switched to the output lead 4. The D.C. levels are switched on as in the previous described embodiment.

Since $S(t) - s(t-T)$ equals 1, and $S(t) - s(t-T)$ equals $\cos \pi t/T$ $4 - t/T-$ being smaller than $\frac{1}{2}$, and 0 elsewhere, one can see that the resultant signal is the same as that of FIG. 2, but phase shifted.

It should be noted that when a pulse has the form of the latter equation and is used in an offset quadrature carrier system, we obtain the well-known minimum shift keying MSK signal.

The output signal described above has been shown to have no jitter and no inter-symbol interference.

The logic could also be designed by a person skilled in the art to cause $\pi$ radians of a positive slope sine wave from sine wave generator 5 to be connected to output lead 4 where there is a positive transition from a 0 to a 1 in the input data stream, for 1 bit interval. Further, $\pi$ radians of a sine wave having negative slope should be connected to the output lead where there is a negative transition from 1 to 0 in the input data stream. Where there is no transition, a positive or negative D.C. level from generators 7 or 8 should be connected according to the logic levels of the input data, respectively 1 or 0. The connection time should also be one bit interval. Accordingly a smooth output signal without discontinuities is formed.

FIG. 4 shows a logic schematic of the first-described embodiment of the invention. The NRZ input signal is applied to input lead 20, and is further applied to one input of both of EXCLUSIVE OR gates 21 and 22. A sine wave generator 23 has its output connected to a pulse generator and delay circuit 24, which has its own output connected to the clock lead CLK. The sine wave generator output is also connected to one input of operational amplifier 25, which has its output connected to the second input of EXCLUSIVE OR gate 21. The second input of operational amplifier 25 is connected to a source of potential $+V$ through a potentiometer 26 (which is also connected to ground), for establishing a threshold of operation. The input signal is also connected to the sync input to sine wave generator 23.

The output of EXCLUSIVE OR gate 21 is connected to one input of AND gate 27, and through inverter 28 to one input of AND gate 29. The output of EXCLUSIVE OR gate 22 is connected to the second input of AND gates 27 and 29.

The outputs of AND gates 27 and 29 are respectively connected to the D signal inputs of flip-flops 30 and 31.

The output of OR gate 22 is also connected to one input of AND gate 33 as well as one input of AND gate 34. The outputs of AND gates 33 and 34 are connected to the D signal input of flip-flops 35 and 36, respectively.

The output of OR gate 22 is also connected to one input of AND gate 37. The output of inverter 32 is connected to one input of AND gate 38. The clock lead is connected to the second inputs of both of AND gates 37 and 38. The output of AND gate 38 is connected to both clock inputs of flip-flops 30 and 31, and the output of AND gate 37 is connected to both clock inputs of flip-flops 35 and 36.

The Q output of flip-flops 30, 31, 35 and 36 are connected to enable inputs 39, 40, 41 and 42 of electronic switches 43, 44, 45 and 46, respectively. These switches can be CMOS switches, or the like. The individual enable leads are connected through resistors 47, 48, 49 and 50 respectively to a source of potential $+V$, for operating potential.

The input lead 51 to switch 43 is connected to a sine wave source; input lead 52 of switch 44 is connected to a cosine signal source (sin — radians); input lead 53 to switch 45 is connected to a source of negative potential having a voltage equal to the peak amplitude of the sine signal source; input lead 54 to switch 46 is connected to a positive D.C. source of potential having amplitude equal to the peak sine wave level.

The output of switches 43, 44, 45 and 46 are individually connected through respective resistors 55, 56, 57 and 58 to output lead 59, which forms the output lead of the filter.

Output lead 59 is connected to one input of operational amplifier 60, which has its second, inverted input lead connected to a source of potential $+V$ through potentiometer 61, which is connected between the source of potential and ground.

The output of operational amplifier 60 is connected to the second input of OR gate 22, the second input of AND gate 34, and through inverter 62 to the second input of AND gate 33.

It may be seen that operational amplifiers 25 and 60 operate as threshold comparators. Therefore slope leading and trailing edges of signals applied thereto are converted to square wave forms of leading and trailing edges. The output signal from lead 59, applied to the threshold comparator comprising operational amplifier 60 therefore appears at its output as square wave functions, and similarly the sine wave output from sine wave generator 23 appears at the output of operational amplifier 25 of a square wave.

The sine wave generator 23 operates at the same bit rate as the input NRZ signal on lead 20, and achieves this by the application of the NRZ signal to a sync input of the sine wave generator. Similarly the clock output from pulse generator and delay circuit 24 is also at the same bit rate as the input NRZ signal.

Both the NRZ input signal and the clock signal are applied to EXCLUSIVE OR gate 21. Also, the NRZ input signal and the output signal from operational amplifier 60 are applied to the inputs of EXCLUSIVE OR gate 22. It may be seen that when the output signal on lead 59 is the same as the input signal, there is no output from EXCLUSIVE OR gate 22. The output of EXCLUSIVE OR gate 22 is therefore low, and a low level signal is applied to the inputs of AND gates 27, 29 and 37.

However inverter 32 converts this signal to a high level signal, and it is applied to the input of AND gate 33. Where the output signal on lead 59 is of low level (a 0), this is converted by inverter 62 to a high level 1, and an output appears from AND gate 33 which is applied to the signal input of flip-flop 35. With the clock input operating flip-flop 35, an output signal from its Q output causes enabling of gate 45, and a negative D.C. signal from lead 53 is switched to output lead 59.

In the event the output signal on lead 59 had been a 1 (high level), and also the same as the input NRZ bit, the input to inverter 62 would have been at high level, and a low level 0 would have been applied to the input of AND gate 33. However a high level 1 would have been input to AND gate 34, along with the high level output from inverter 32. Accordingly AND gate 34 would provide an output signal to flip-flop 36, causing operation of switch 46, thus switching a positive D.C. signal from lead 54 to output lead 59.

The inputting of the clock signal, of course, causes flip-flops 35 and 36 to switch off after a bit period, thus removing the enable input from gates 45 and 46, effectively shutting off the negative or positive D.C. signals from lead 59.

In the event the output bit on lead 59 is different from the incoming NRZ bit, the input signals to EXCLUSIVE OR gate 22 will be different. Accordingly the output of EXCLUSIVE OR gate 22 will be a high level 1. The output of inverter 32 will be at low level, which inhibits operation of AND gates 33 and 38.

However the high level output of EXCLUSIVE OR gate 22 is applied to AND gate 37, which operates in synchronism with the clock, and applies a clear signal to flip-flops 35 and 36.

The high level output of EXCLUSIVE OR gate 22 is applied to one input of each of AND gates 27 and 29. In the event the NRZ input bit is a 1, it is applied in synchronization with the high level 1 input signal from the sine wave generator as applied through operational amplifier 25. Accordingly the inputs to EXCLUSIVE OR gate 21 are the same, and the output is a 0. This signal applied to one input of AND gate 27 inhibits its operation (although the second input to AND gate 27 is a 1). The output 0 from EXCLUSIVE OR gate 21 is applied through inverter 28 and appears as a 1 at the input of AND gate 29. With the 1 applied from the output of EXCLUSIVE OR gate 22 to AND gate 29, an output signal from AND gate 29 is applied to the signal input of flip-flop 31. Flip-flop 31 provides a high level output at its Q lead in synchronism with the clock input, causing enabling of switch 44. The sine wave which is input on lead 52 is switched in switch 44 to output lead 59. The sine wave input is of course the same sine wave as generated in sine wave generator 23.

In the event the input NRZ bit to EXCLUSIVE OR gate 21 is a 0, the inputs to EXCLUSIVE OR gate 21 will be different, and the output therefrom will be a 1. This is applied to one input of AND gate 27 with the output of EXCLUSIVE OR gate 22, which is also a 1. AND gate 27 is thus enabled, and applies a 1 to flip-flop 30. A signal appears at the Q output of flip-flop 30 in synchronism with the clock input to the flip-flop, and switch 43 is enabled. The sine wave applied to lead 51 is thus switched through switch 43 to output lead 59.

Upon the inputs to EXCLUSIVE OR gate 22 becoming the same, the output signal therefrom becomes a 0, removing the enabling signals from one of the inputs of both of AND gates 27 and 29. Inverter 32 changes the 0 to a 1, and applies it to one input of AND gate 38. In synchronism with the clock, therefore, an output signal from AND gate 38 is applied to the clear inputs of flip-flops 30 and 31, removing the enabling signals from switches 43 and 44.

It may be seen that the inputs to leads 51 and 52 from the sine wave generator must be shifted in phase by well-known means so that the input signals are 180° out-of-phase, and also are at their peak positive or negative values at the instant that switches 43 and 44 are enabled. Further, the positive or negative amplitudes of the D.C. signals applied to lead 53 and 54 should be the same as the peak positive or negative amplitudes of the sine waves applied to leads 51 and 52.

The synchronization circuits described above cause the switching in of the appropriate D.C. or sine wave signals for the bit period required to cause the circuit to operate as a switched filter. The signal amplitudes and phases should of course be carefully controlled in order that the output signal on lead 59 should be smooth and continuous.

A person understanding this invention may now conceive of changes or other embodiments which utilize the principles of the invention. All are considered within the sphere and scope of the invention as defined in the claims appended hereto.

I claim:

1. A filter having an input for receiving a pulse signal form of binary information and an output for providing a synthesized output signal correlated to the input signal comprising:
    (a) means for comparing the output signal with the input signal one bit at a time,
    (b) means connected to said comparing means and said output for generating a first predetermined output signal waveform when the output signal bit is different from that of the input signal and the input signal is binary "1",
    (c) means connected to said comparing means and said output for generating a second predetermined output signal waveform when the output signal bit is different from that of the input signal and the input signal is binary "0",
    (d) means connected to said comparing means and said output for generating a third predetermined output signal waveform when the output signal bit is the same as that of the input signal and the input signal is binary "1",
    (e) means connected to said comparing means and said output for generating a fourth predetermined output signal waveform when the output signal bit is the same as that of the input signal and the input signal is binary "0",
    in which the predetermined output signals are continuous, whereby the spectra and sidelobes of the output signal which is correlated to the input signal are controlled to a predetermined extent.

2. A filter as defined in claim 1, in which the third predetermined output signal waveform is a D.C. level at the peak amplitude of the first predetermined output signal, and the fourth predetermined output signal waveform is a negative D.C. level of the peak amplitude of the second predetermined output signal.

3. A filter as defined in claim 2 in which the first predetermined output signal waveform is $\pi$ radians of a sine wave having a waveform of A sin $\pi$t, and the second predetermined output signal waveform is a portion of a sine wave having a waveform of $-$A sin $\pi$t$-$, where A is the peak amplitude of the sine wave signal and t is time from the beginning of the first predetermined output signal waveform.

4. A filter as defined in claim 1, 2 or 3 in which the input signal is of NRZ form.

5. A filter as defined in claim 2, in which the first predetermined output signal is if the form of a raised cosine double-interwalled pulse of the form $\frac{1}{2}(1+\cos \pi t/T)$, and the second predetermined output signal is of the form of a raised cosine double-interwalled pulse of the form $-\frac{1}{2}(1+\cos \pi t/T)$ where T is the signalling rate interval.

6. A filter as defined in claim 1, 2 or 3 in which the input signal is of NRZ form and the output signal is substantially free of both jitter and inter-symbol interference.

7. A filter having an input for receiving an input pulse type signal and an output for providing an output signal comprising:
 (a) means for comparing the output signal with the input signal,
 (b) means connected to said comparing means and said output for generating a first predetermined output signal waveform for one bit interval when the output signal is different from the input signal, and
 (c) means connected to said comparing means and said output for generating a second predetermined output signal waveform for one bit interval when the output signal is the same as the input signal,
whereby the spectra and sidelobes of the output signal which is correlated to the input signal are controlled to a predetermined extent, while retaining the data form of the input signal.

* * * * *